US007027072B1

(12) United States Patent
Sadowski

(10) Patent No.: US 7,027,072 B1
(45) Date of Patent: Apr. 11, 2006

(54) METHOD AND SYSTEM FOR SPATIALLY COMPOSITING DIGITAL VIDEO IMAGES WITH A TILE PATTERN LIBRARY

(75) Inventor: Greg Sadowski, Santa Clara, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 431 days.

(21) Appl. No.: 09/689,785

(22) Filed: Oct. 13, 2000

(51) Int. Cl.
G06T 17/00 (2006.01)

(52) U.S. Cl. .................. 345/629; 345/630; 345/632; 345/634; 345/635; 345/641

(58) Field of Classification Search ............... 345/629, 345/630, 632, 634, 635, 641, 694, 781
See application file for complete search history.

(56) References Cited

U.S. PATENT DOCUMENTS

| | | | | |
|---|---|---|---|---|
| 4,780,709 | A * | 10/1988 | Randall .................... 345/27 |
| 5,146,335 | A * | 9/1992 | Kim et al. ................ 348/564 |
| 5,712,995 | A * | 1/1998 | Cohn ....................... 345/792 |
| 5,736,988 | A | 4/1998 | Shaw et al. .............. 345/423 |
| 5,815,168 | A * | 9/1998 | May ......................... 345/572 |
| 6,008,803 | A * | 12/1999 | Rowe et al. .............. 345/721 |
| 6,104,842 | A | 8/2000 | Rich ......................... 382/304 |
| 6,191,800 | B1 | 2/2001 | Arenburg et al. ........ 345/505 |
| 6,219,058 | B1 | 4/2001 | Trika ........................ 345/423 |
| 6,223,183 | B1 * | 4/2001 | Smith et al. .............. 707/102 |
| 6,229,544 | B1 * | 5/2001 | Cragun ..................... 345/418 |
| 6,259,826 | B1 | 7/2001 | Pollard et al. ............. 382/284 |
| 6,344,852 | B1 | 2/2002 | Zhu et al. ................. 345/418 |
| 6,396,325 | B1 | 5/2002 | Goodell .................... 327/308 |
| 6,466,223 | B1 | 10/2002 | Dorbie et al. ............. 345/582 |
| 6,470,287 | B1 * | 10/2002 | Smartt ....................... 702/102 |
| 6,483,515 | B1 * | 11/2002 | Hanko ....................... 345/545 |
| 6,515,673 | B1 * | 2/2003 | Hashimoto et al. ....... 345/582 |
| 6,525,737 | B1 * | 2/2003 | Duluk et al. .............. 345/506 |

(Continued)

OTHER PUBLICATIONS

U.S. Appl. No. 09/689,784, Sadowski et al., filed on Oct. 13, 2000.
U.S. Appl. No. 09/689,786, Sadowski, filed Oct. 13, 2000.

*Primary Examiner*—Michael Razavi
*Assistant Examiner*—Daniel Chung
(74) *Attorney, Agent, or Firm*—Sterne, Kessler, Goldstein & Fox P.L.L.C.

(57) ABSTRACT

A method and system for spatially compositing digital video images with a tile pattern library. Spatial compositing uses a graphics pipeline to render a portion (tile) of each overall frame of digital video images. This reduces the amount of data that each processor must act on and increases the rate at which an overall frame is rendered. Optimization of spatial compositing depends on balancing the processing load among the different pipelines. The processing load typically is a direct function of the size of a given tile and an inverse function of the rendering complexity for objects within this tile. Load balancing strives to measure these variables and adjust, from frame to frame, the number, sizes, and positions of the tiles. The cost of this approach is the necessity to communicate, in conjunction with each frame, the number, sizes, and positions of the tiles. A tile pattern library is a collection of sample compositing windows of various shapes each of which is decomposed into tiles of various shapes and positions. Associated with each sample in the tile pattern library is an index code that can be used to communicate the overall pattern. This reduces the amount of data needed to convey the parameters that define each tile.

23 Claims, 11 Drawing Sheets

U.S. PATENT DOCUMENTS

| | | | |
|---|---|---|---|
| 6,552,723 B1 * | 4/2003 | Duluk, Jr. et al. | 345/419 |
| 6,624,797 B1 | 9/2003 | Wheeler et al. | 345/1.2 |
| 6,714,196 B1 | 3/2004 | McCormack et al. | 345/423 |
| 6,724,403 B1 * | 4/2004 | Santoro et al. | 345/765 |
| 6,724,946 B1 | 4/2004 | Kusama et al. | 382/284 |
| 2002/0145612 A1 | 10/2002 | Blythe et al. | 345/581 |

* cited by examiner

602
OBTAIN, FROM THE TILE PATTERN LIBRARY,
AN IDEX CODE THAT IDENTIFIES THE CHOSEN TILE PATTERN
WHEREIN THE INDEX CODE MINIMIZES THE AMOUNT OF DATA NEEDED TO CONVEY
THE PARAMETERS THAT DEFINE THE COMPOSITING WINDOW AND
THE PARAMETERS THAT DEFINE EACH OF THE TILES

FIG.6

METHOD AND SYSTEM FOR SPATIALLY COMPOSITING DIGITAL VIDEO IMAGES WITH A TILE PATTERN LIBRARY

CROSS-REFERENCE TO RELATED APPLICATIONS

This patent application is potentially related to the following commonly owned, co-pending U.S. utility patent applications:
1. "Method and System for Minimizing an Amount of Data Needed to Communicate Tile Information in Spatially Composited Digital Video," Ser. No. 09/689,784, by G. Sadowski et al., filed concurrently herewith and incorporated herein by reference; and
2. "Method and System for Spatially Compositing Digital Video Images with Coarse Tiles," Ser. No. 09/689,786, by G. Sadowski, filed concurrently herewith and incorporated herein by reference.

BACKGROUND OF THE INVENTION

1. Field of the Invention

The present invention relates to computer graphics technology.

2. Discussion of the Related Art

Among the many functions that can be performed on personal and workstation computers, the rendering of images has become one of the most highly valued applications. The ever advancing demand for increasingly sophisticated image rendering capabilities has pulled the development of both hardware and software technologies towards meeting this end. Indeed, computer graphic applications have facilitated the introduction of multiprocessors into the designs of personal and workstation computers.

To increase rendering speed, computer graphics processes have been decomposed into standard functions performed in sequential stages of a graphics pipeline. At least one processor operates on each stage. As each stage completes its specific function, the results are passed along to the next stage in the pipeline. Meanwhile, the output of a prior stage (relating to the next frame in the sequence) is received. In this manner, the rendering speed of the overall process is increased to equal the processing speed of the slowest stage. Stages can be implemented using hardware, software, or a combination thereof.

At the most fundamental level, computer graphics pipelines typically include, in sequential order, a geometry stage and a rasterizer stage. An application passes graphics data to a computer graphics pipeline. For example, an application may determine the image to be rendered and model the three-dimensional curvilinear form of each object in the image as a three-dimensional assembly of interconnected two-dimensional polygons (or any other type of primitive) that approximates the shape of the object. Each polygon is defined by a set of coordinates and an outwardly pointing vector normal to the plane of the polygon.

The geometry stage acts on the graphics data it receives from the application. The geometry stage often is further decomposed into more functional stages, each of which can have an associated processor to perform operations. For example, these stages can include, but are not limited to, a model and view transform stage, a light and shading stage, a projection stage, a clipping stage, a screen mapping stage, and others. The rasterizer stage uses the results of the geometry stage(s) to control the assignment of colors to pixels as the image is rendered.

As computer graphics has matured as a technology, standards have been created to coordinate paths of development, to ensure compatibility among systems, and to reduce the amount of investment capital necessary to further the state of the art. These standards allow designers a fair degree of leeway in choosing between hardware and software technologies to perform specific functions. Therefore, for a given hardware architecture, much of the current efforts in developing computer graphics centers on means to optimize the processing power of the given architecture.

The use of multiple processors in computer graphics hardware not only enables stages in a graphics pipeline to be processed simultaneously, but also allows for additional graphics pipelines for parallel processing. State of the art architecture has utilized these additional pipelines to process succeeding frames of images to support changes in a scene with time. Where the computer graphics hardware has "n" pipelines, each pipeline processes every $n^{th}$ frame in a sequence of frames. Each pipeline renders all of the objects and the background in a single frame. Often the outputs of the pipelines are multiplexed together to increase further the speed at which a sequence of frames is rendered. This process is known as temporal compositing, as image outputs from the pipelines are combined with respect to time.

While temporal compositing marks a major advancement in computer graphics performance, there are situations in which this approach may not optimize the processing power of the given architecture. Optimal temporal compositing, for a given number of graphics pipelines, depends on the relationship between the rendering speed of a given pipeline and the rate at which image outputs can be combined. A higher degree of image complexity, caused by additional features to improve the quality of the image, can reduce the speed at which a frame of an image is rendered by a graphics pipeline. This, in turn, lowers the rate at which image outputs can be combined.

Another problem posed by the temporal compositing process arises when the rendered images reside in an interactive environment. In an interactive environment, a user viewing a sequence of frames of images is permitted to supply a feedback signal to the system. This feedback signal can change the images that are rendered. In a temporal compositing system, there is a substantial delay between the time at which the user provides the feedback signal and the time at which the system responds to it. The user supplies the feedback signal at a particular frame to one of the pipelines in the system. Because the other pipelines are already in the process of rendering their pre-feedback frames, the system typically imposes a time delay to allow the other pipelines to complete their rendering of these frames before acting on the feedback signal.

SUMMARY OF THE INVENTION

The present invention provides a method and system for spatially compositing digital video images with a tile pattern library. It relates to an approach to optimizing the utilization of multiple pipelines. Rather than having each pipeline render an entire frame of a sequence of frames and having the output of each pipeline combined temporally, spatial compositing uses each pipeline to render a portion of each overall frame and combines the output of each pipeline spatially with respect to the location of the rendered portion within the overall frame. By reducing the amount of graphics data that each processor must act on, spatial compositing increases the rate at which an overall frame is rendered.

Optimization depends on the ability of the system to balance the processing load among the different pipelines. The processing load typically is a direct function of the size of a given tile and an inverse function of the rendering complexity for objects within this tile. Load balancing strives to measure these variables and adjust, from frame to frame, the number, sizes, and positions of the tiles as necessary to balance the processing load. The cost of this approach is the necessity to communicate, in conjunction with each frame, the number, sizes, and positions of tiles being used for that given frame. Where spatial compositing involves the use of a large number of tiles, this can add substantially to the overhead information that must be communicated for each frame of spatially composited digital video. This situation compounds an already difficult problem with state of the art computer hardware technologies. As advancements in memory capacities and processor speeds have outstripped improvements in interconnect bus throughputs, data links have become bottlenecks of serious concern. Therefore, optimization of a spatial compositing process requires a method and system for minimizing the amount of data needed to communicate the number, sizes, and positions of the tiles.

Because the present invention presents a method that is implemented with each frame of digital video, the approach recognizes that a different number of digital video display units can be used for each frame. Thus, the method is initiated by counting the number of digital video display units that will be used for a given implementation of spatial compositing. Next, a tile pattern is chosen from a tile pattern library. Within the chosen tile pattern, the amount of tiles included equals the number of digital video display units counted. Furthermore, the chosen tile pattern can take into account the complexity of the image output to be rendered by each digital video display unit. Thereafter, a compositing window is created within a display area of a compositor and the compositing window is decomposed into a number of tiles equal to the number of tiles in the chosen tile pattern. The chosen tile pattern is identified by an index code that can be communicated to a compositor.

This reduces the amount of data needed to convey the parameters that define the corresponding windows and each of the tiles. For example, where the compositing window comprises four tiles, all with rectangular shapes, the parameters that could be communicated are coordinate values for corners of all of the rectangles. This would amount to twenty sets of coordinates. If pixel coordinates range from zero to one thousand, in decimal format these coordinate values require four digits to be expressed. In binary format, ten bits are required to communicate each coordinate value. Therefore, with twenty sets of coordinates and two coordinates per set, 400 bits would be necessary to communicate the parameters. In a tile pattern library with 256 tile patterns, each tile pattern can be represented by an index code eight bits in length. Where spatial compositing involves large numbers of tiles or where compositors are combined in cascading stages such that the output of one or more compositors is an input for another compositor, this compression of data is even more substantial.

Further embodiments, features, and advantages of the present invention, as well as the structure and operation of the various embodiments of the present invention, are described in detail below with reference to the accompanying figures.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 6 shows the step for minimizing an amount of data needed to convey the parameters that define the compositing window and each of the tiles by referencing an index code for the chosen tile pattern.

Figure 1:
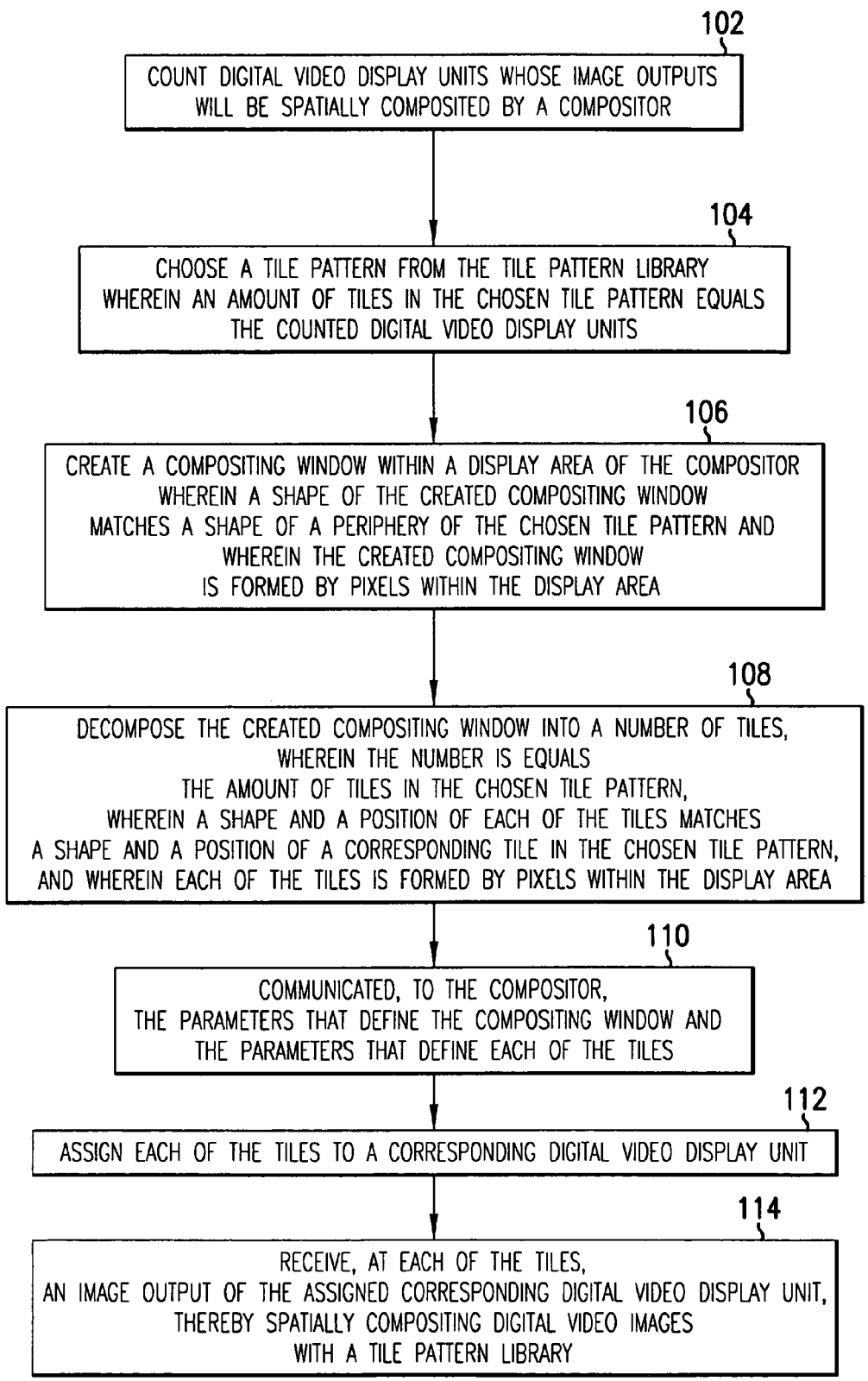
FIG. 1 is a flowchart representation of a method for spatially compositing digital video images with a tile pattern library.

A preferred embodiment of the invention is described with reference to the figures where like reference numbers indicate identical or functionally similar elements. Also in the figures, the left most digit(s) (either the first digit or first two digits) of each reference number identify the figure in which the reference number is first used.

DETAILED DESCRIPTION OF THE PREFERRED EMBODIMENTS

Overview and Terminology

The present invention provides a method and system for spatially compositing digital video images with a tile pattern library.

"Digital video images" are a sequence of images presented for continuous viewing from a digital electronic format by a "digital video display unit". The color, intensity, and other information for each location on an image is represented by values stored in a "pixel". Pixels in a display unit reside in an array of rows and columns. A single complete video image is referred to as a "frame". In creating a frame, the computer graphics technology is said to "render" the image. To increase rendering speed, computer graphics processes have been decomposed into standard functions performed in sequential stages of a graphics "pipeline". At least one processor operates on each stage.

The use of multiple processors in computer graphics hardware not only enables stages in a graphics pipeline to be processed simultaneously, but also allows for additional graphics pipelines for parallel processing. With parallel processing, pipelines can be assigned to different images. Using this architecture, the different images must be combined, by "compositing", to be presented for final viewing. Compositing can be accomplished through several different methods. Where frames are presented in a dynamic sequence, "temporal compositing" can be performed using each pipeline to process a succeeding frame. Compositing can also be used to blend together different aspects of a given frame. For example, an image representing the colors of a frame can be combined with another image that accounts for the effects of different light sources, which in turn can be combined with another image that tracks the depth of different objects in the image. One skilled in the art will recognize other features that can be represented in images combined for a frame by compositing.

The present invention relates to a different approach to optimizing the utilization of multiple pipelines. Rather than having each pipeline render an entire frame of a sequence of frames and having the output of each pipeline combined temporally, "spatial compositing" uses each pipeline to render a portion of each overall frame and combines the output of each pipeline spatially with respect to the location of the rendered portion within the overall frame. By reducing the amount of graphics data that each processor must act on, spatial compositing increases the rate at which an overall frame is rendered.

A "compositor" is a hardware component that performs compositing. Within a compositor resides a "frame buffer", a hardware device capable of receiving input data, storing it in memory organized to correspond to image pixels, and generating all or part of the data as an image. The portion of the frame buffer presented for viewing is designated as the "display area". In spatial compositing, a "compositing window" is located within all or a part of the display area. The compositing window is divided, or "decomposed", into non-overlapping portions called "tiles". Each tile receives the output of an assigned pipeline to effect spatial compositing. The shape and size of the compositing window and the shape, size, and position of each of the tiles can be defined by "parameters" that characterize the two-dimensional contours. Parameters can include, but are not limited to, coordinate points for corners, centers, or focal points; lengths of radii; interior angles; and degrees of curvature.

Whereas with temporal compositing, heavy loading of a pipeline processor reduces the rate at which frames are rendered, with spatial compositing this rate is increased to that of the slowest pipeline. Therefore, optimization depends on the ability of the system to balance the processing load among the different pipelines. The processing load typically is a direct function of the size of a given tile and an inverse function of the rendering complexity for objects within this tile. "Complexity" results when features are added to an image to improve its quality.

One approach to load balancing strives to measure these variables and adjust, from frame to frame, the number, sizes, and positions of the tiles as necessary to balance the processing load. The cost of this approach is the necessity to communicate, in conjunction with each frame, the number, sizes, and positions of tiles being used for that given frame. Where spatial compositing involves the use of a large number of tiles, this can add substantially to the overhead information that must be communicated for each frame of spatially composited digital video. This situation compounds an already difficult problem with state of the art computer hardware technologies. As advancements in memory capacities and processor speeds have outstripped improvements in interconnect bus throughputs, data links have become bottlenecks of serious concern. One way in which communications of parameters can be minimized is to use a "tile pattern library", a collection of sample compositing windows of various shapes and decomposed into tiles of various shapes and positions. Associated with each sample in the tile pattern library is an "index code", a unique numerical identifier for the given sample. In this manner, communication of compositing window and tile parameters is reduced to transmitting the index code.

State of the art interconnect busses for digital video must meet Digital Visual Interface specifications. "Digital Visual Interface", or "DVI", is an open industry standard designed to enable high performance digital displays while still supporting legacy analog technology. DVI uses both Transitional Minimized Differential Signal data links and Inter Integrated Circuit busses. "Transitional Minimized Differential Signal data links" use a technique that produces a transition controlled DC balanced series of characters from an input sequence of data bytes. Bits in a long string of 1s or 0s are selectively inverted in order to keep the DC voltage level of the signal centered around a threshold that determines whether the received data bit is a 1 voltage level or a 0 voltage level. "Inter Integrated Circuit busses" provide two-wire communication links between integrated circuits. This standard was explicitly designed to support communications between central processing units and peripheral chips.

Operation

Figure 2:
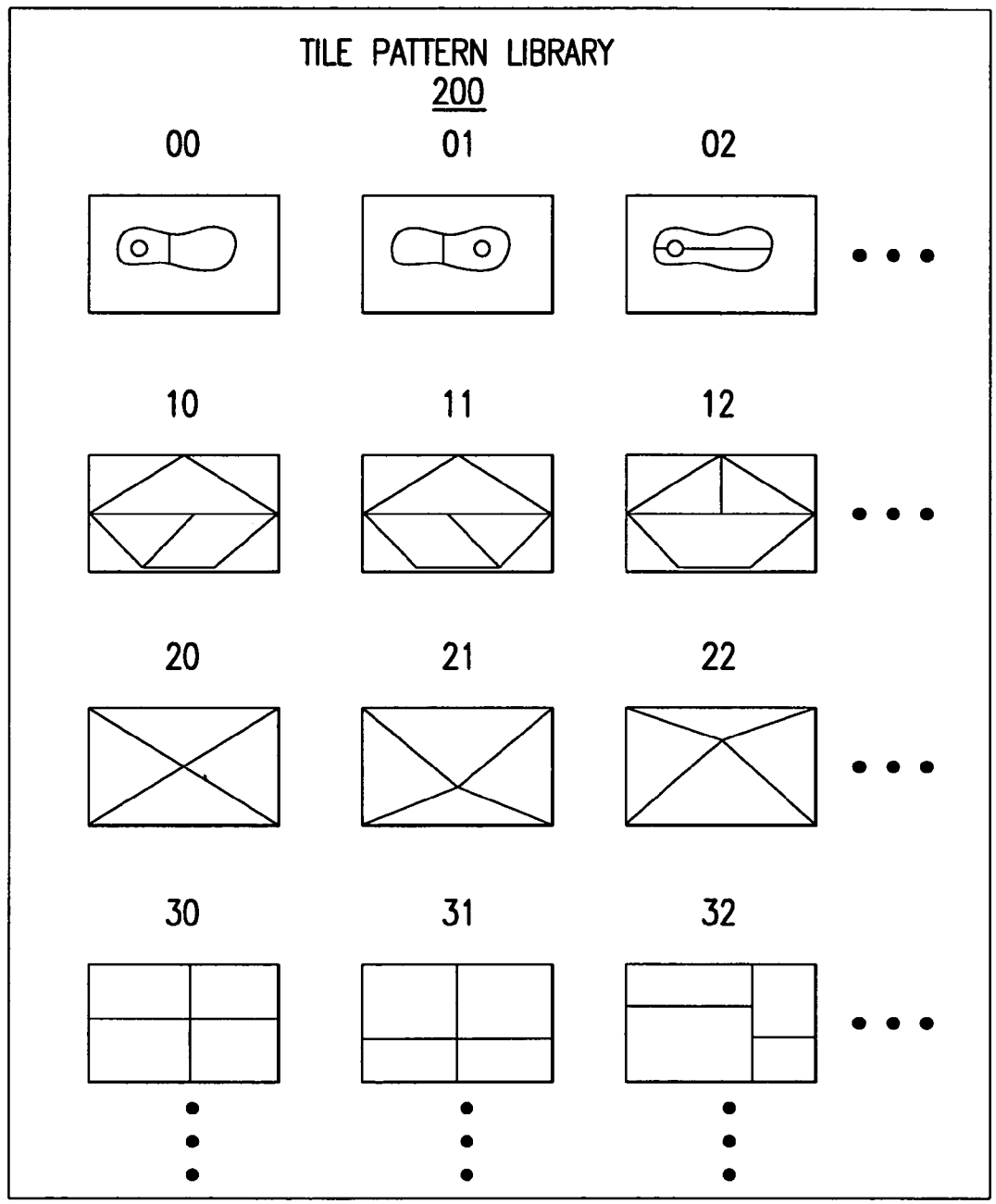
FIG. 2 shows a portion of a sample tile pattern library.
Figure 3:
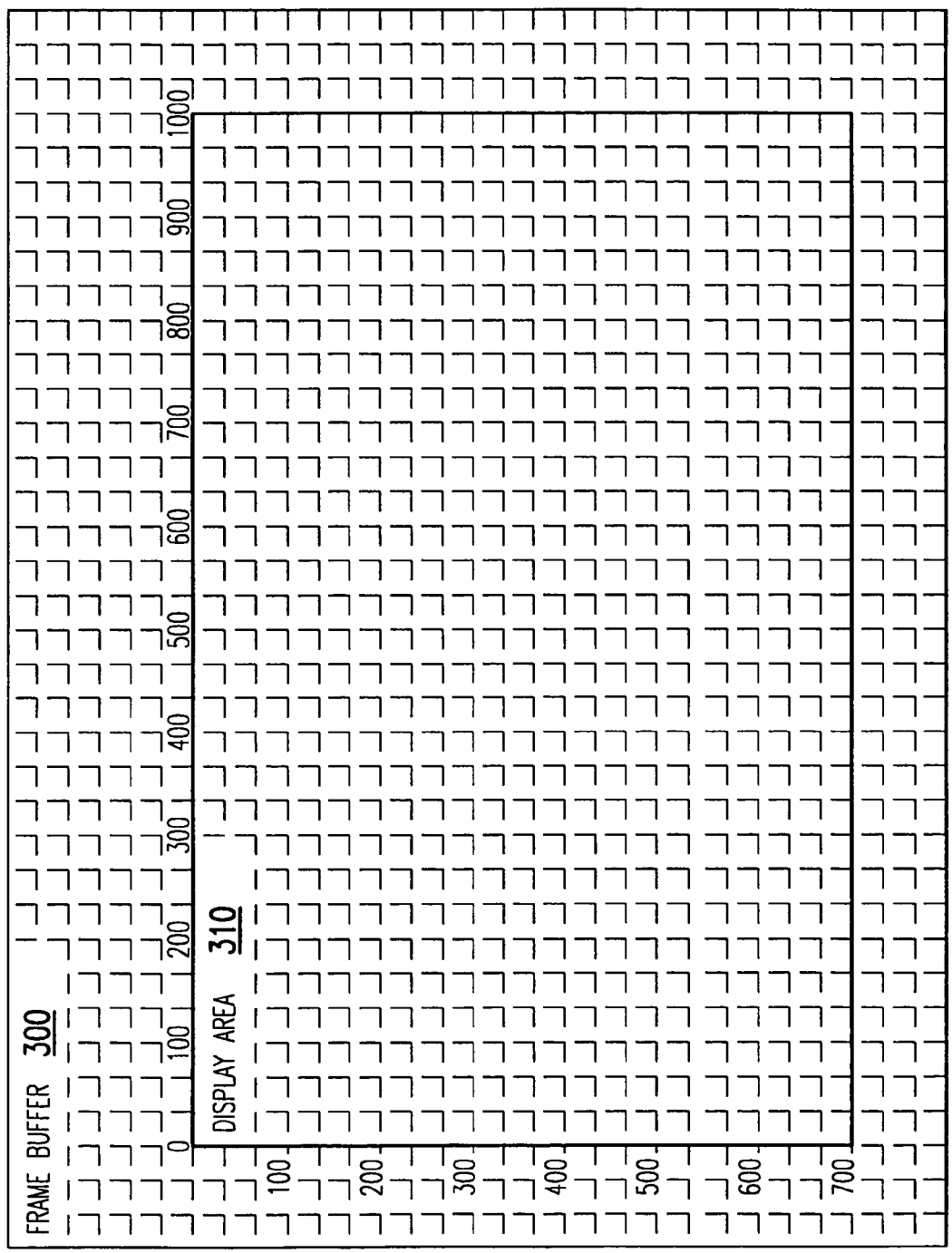
FIG. 3 shows a frame buffer with a display area with pixel coordinate points for the display area.
Figure 4:
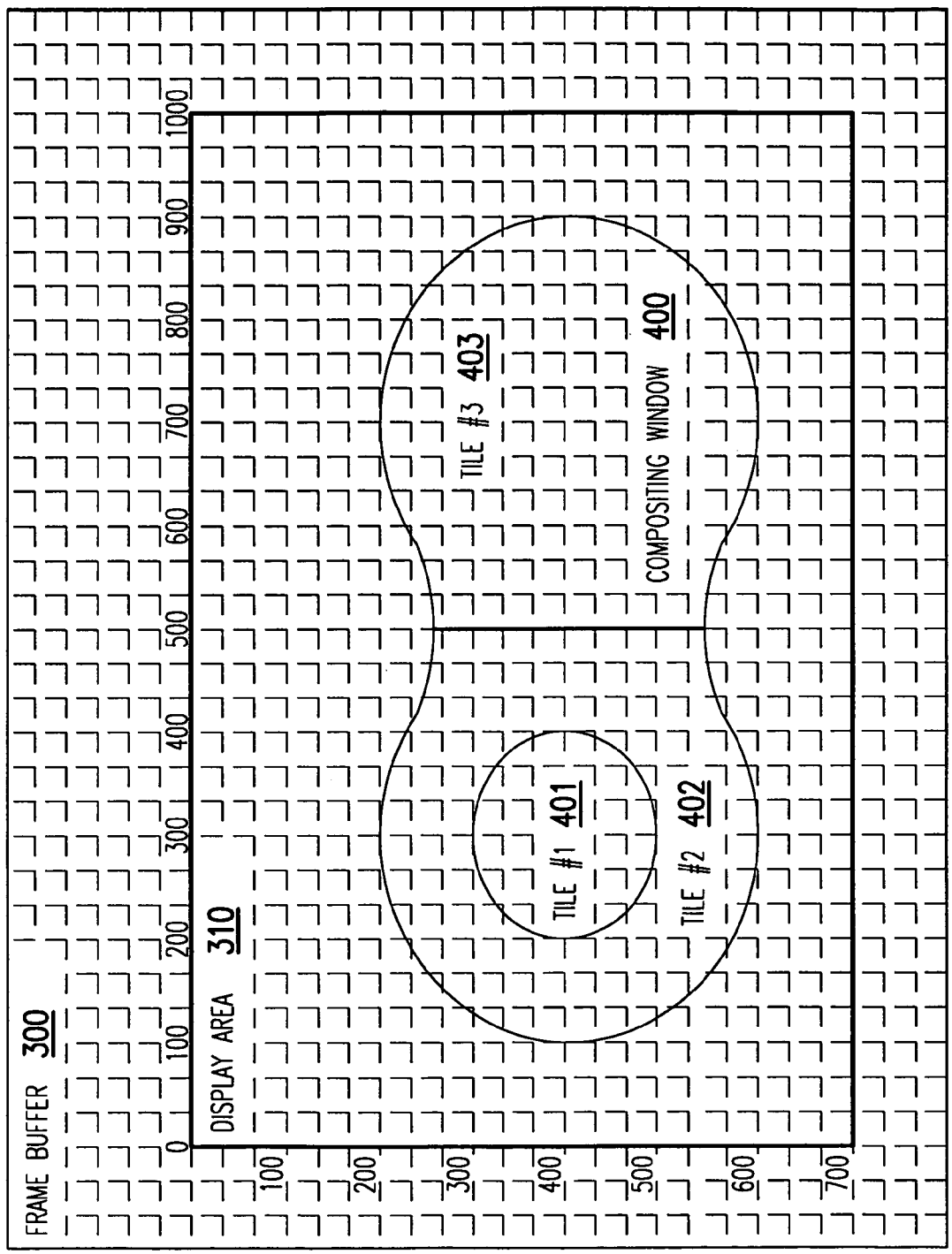
FIG. 4 presents an arbitrary compositing window decomposed into three tiles.
Figure 5:
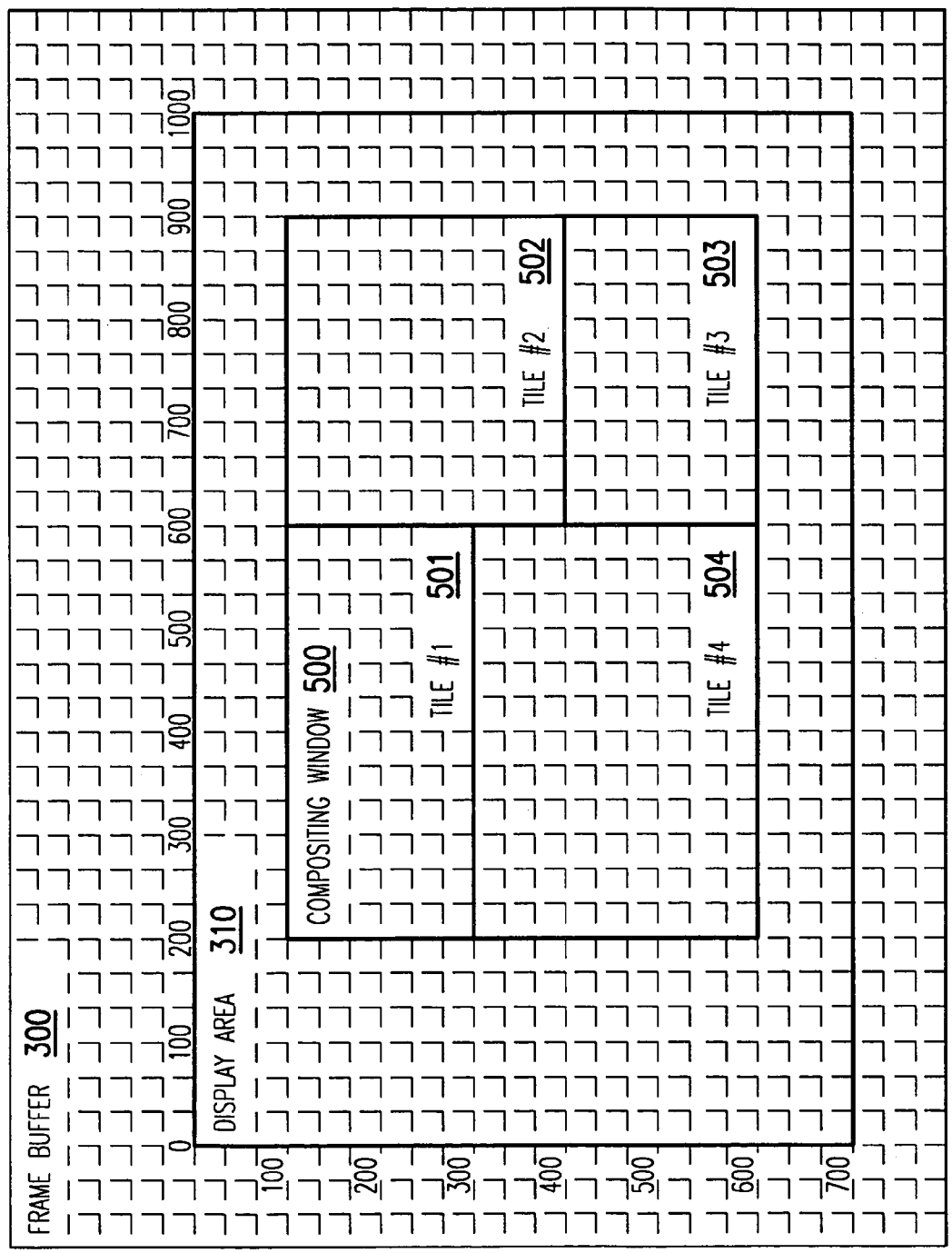
FIG. 5 presents a rectangular compositing window decomposed into four rectangular tiles.
Figure 7:
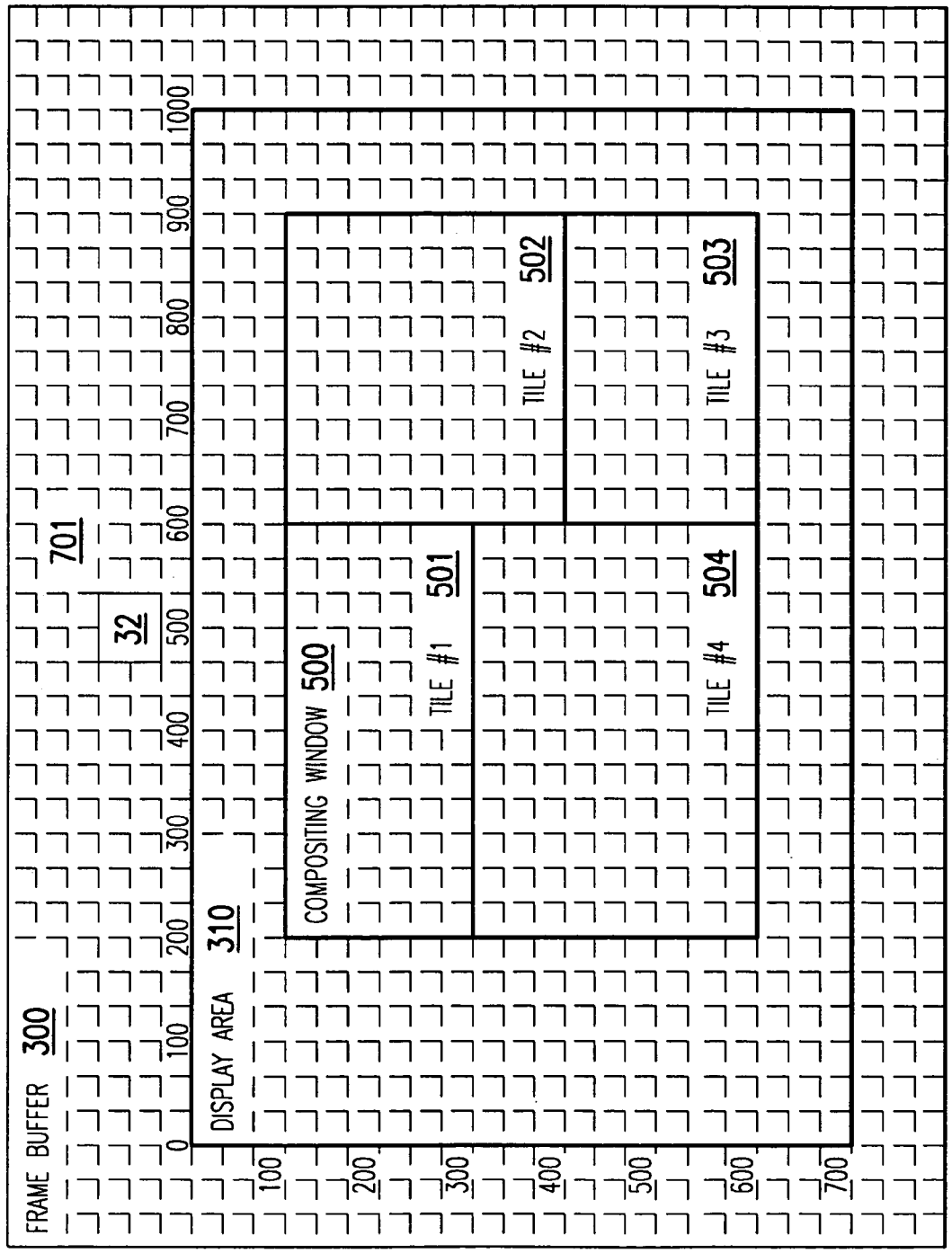
FIG. 7 presents the same rectangular compositing window as FIG. 5 with a sequence of parameters included in the frame buffer outside of the display area.
Figure 8:
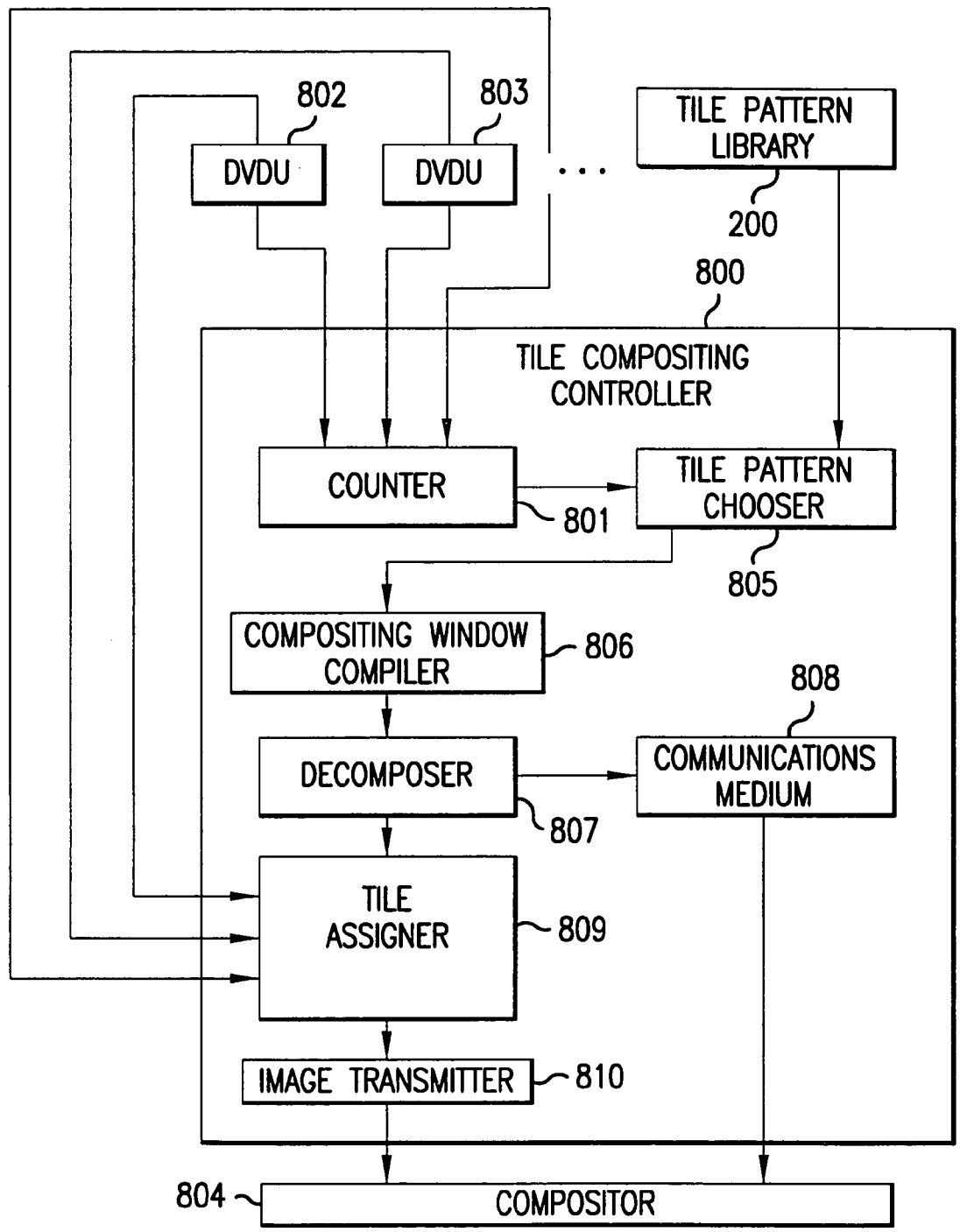
FIG. 8 shows a system for spatially compositing digital video images with a tile pattern library.
Figure 9A:
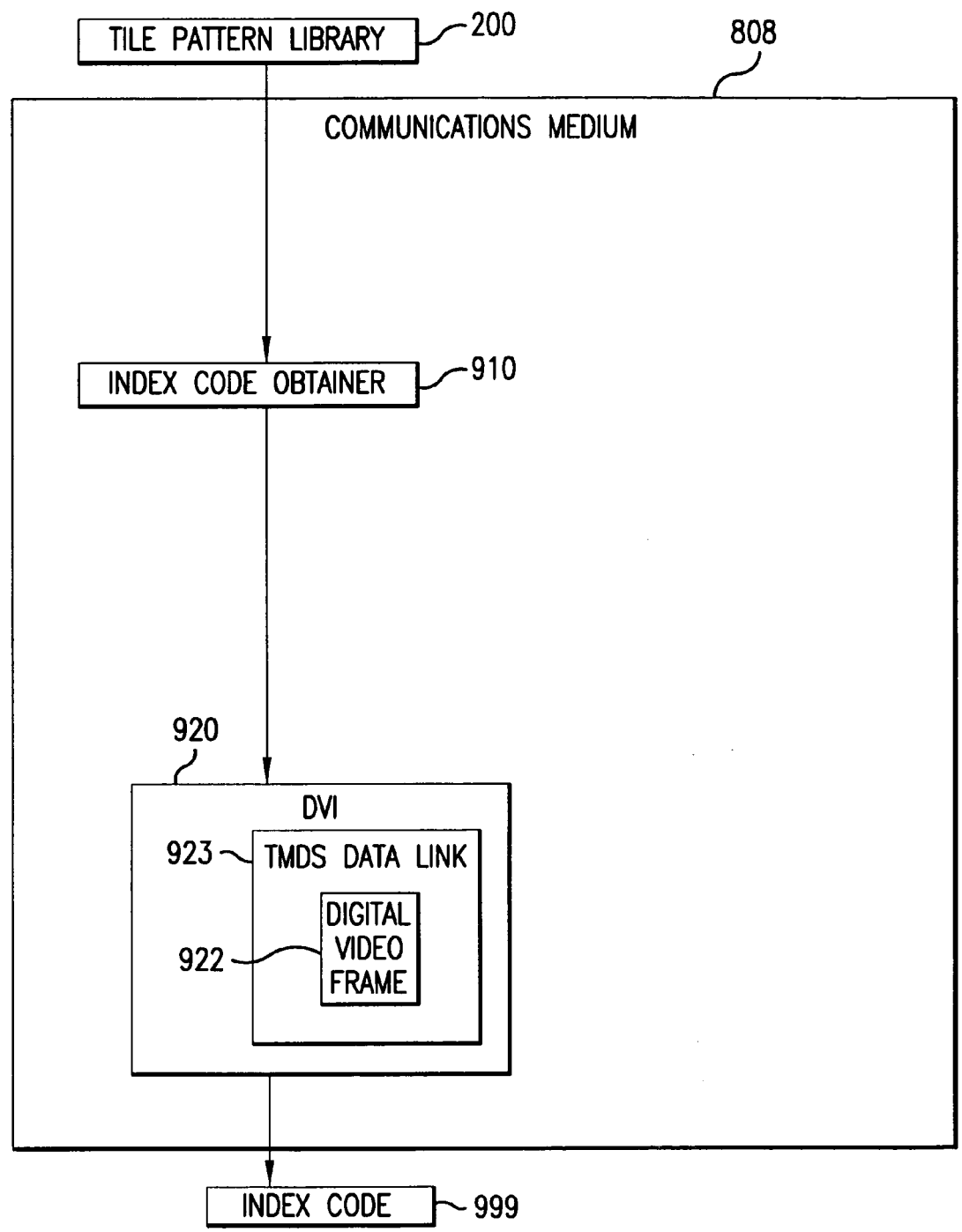
FIG. 9A shows an embodiment of the communications medium that uses a Transitional Minimized Differential Signal data link.
Figure 9B:
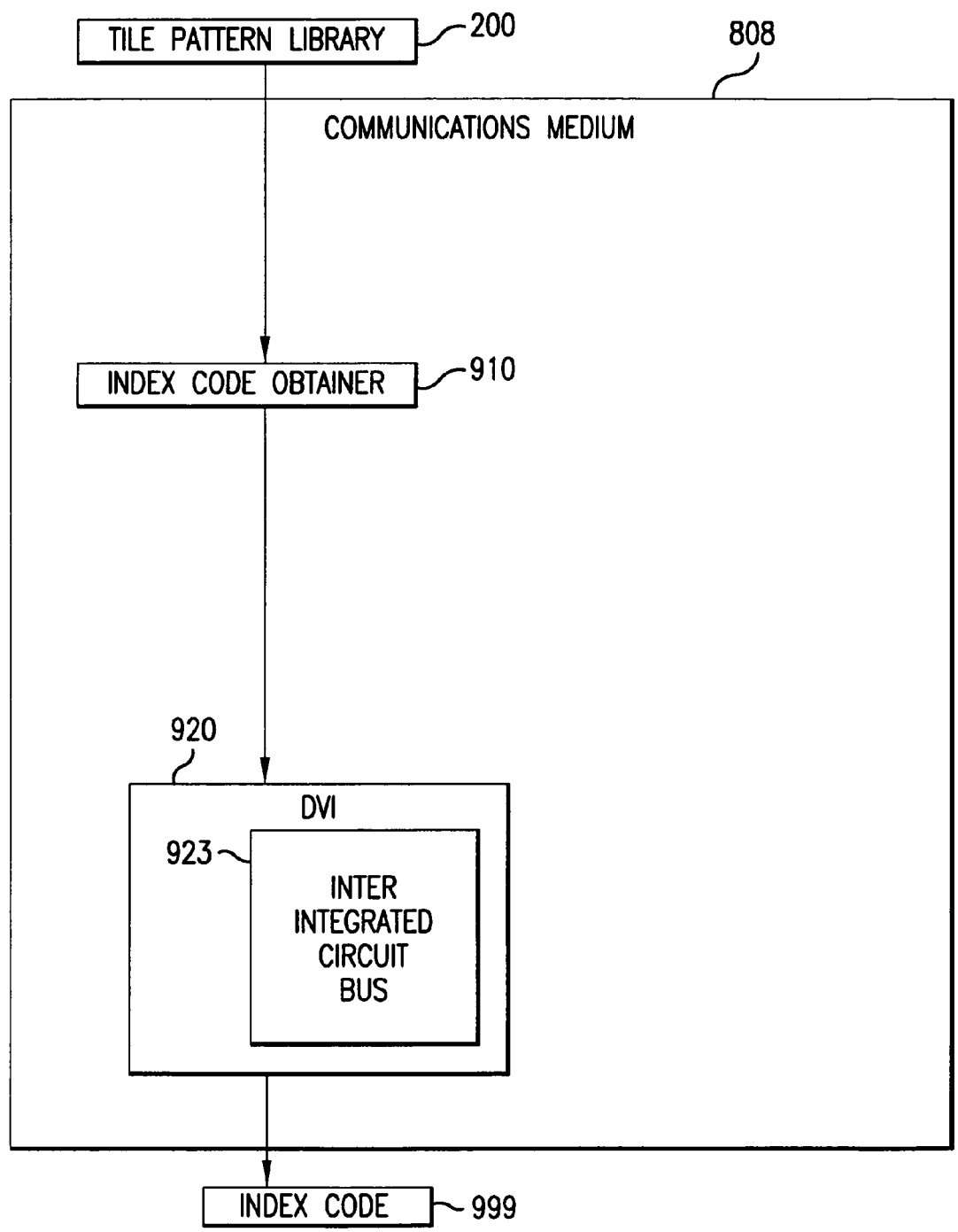
FIG. 9B shows an alternative embodiment of the communications medium that uses an Inter Integrated Circuit bus.
Figure 10:
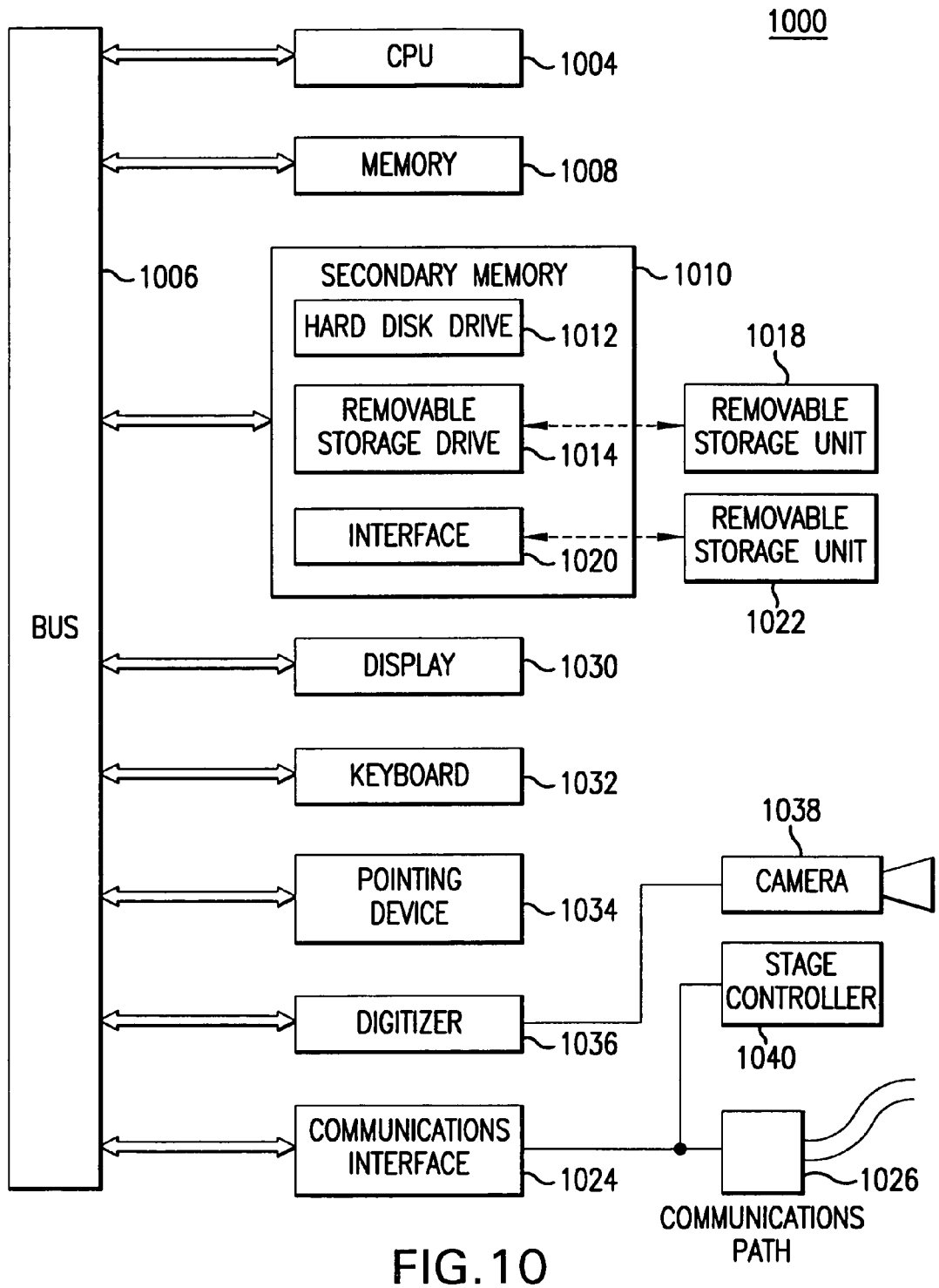
FIG. 10 is a block diagram of an example computer system that can support an embodiment of the present invention.

The present invention will now be described by referencing operational flow diagrams shown in FIGS. 1 and 6. FIGS. 2, 5, and 7 present the frame buffer at various stages of process. FIG. 3 shows a portion of a sample tile pattern library. FIG. 4 presents an arbitrary compositing window. FIGS. 8, 9A, and 9B show system components for the present invention. FIG. 10 is a block diagram of an example computer system that can support an embodiment of the present invention.

FIG. 1 is a flowchart representation of a method for spatially compositing digital video images with a tile pattern library. This method is typically performed by a tile compositing controller which can be embodied in hardware, software, firmware, or a combination thereof. In FIG. 1, at a step 102, digital video display units whose image outputs will be spatially composited by a compositor are counted. Because the present invention presents a method that is implemented with each frame of digital video, the approach recognizes that a different number of digital video display units can be used for each frame. Therefore, the method is initiated by counting the number of digital video display units that will be used for a given implementation of spatial compositing.

At a step 104, a tile pattern is chosen from the tile pattern library. Within the chosen tile pattern, the amount of tiles included equals the number of digital video display units counted. Furthermore, the chosen tile pattern can take into account the complexity of the image output to be rendered by each digital video display unit. FIG. 2 shows a portion of a sample tile pattern library 200.

In FIG. 1, at a step 106, a compositing window is created within a display area of the frame buffer of the compositor. The shape of the compositing window matches the shape of the periphery of the chosen tile pattern. The compositing window is formed by pixels within the display area. At a step 108, the compositing window is decomposed into a number of tiles. The number of tiles equals the amount of tiles in the chosen tile pattern. The shape and position of each tile matches the shape and position of a corresponding tile in the chosen tile pattern. Each of the tiles is formed by pixels within the display area.

FIG. 3 shows a frame buffer 300 with a display area 310 with pixel coordinate points for the display area. FIG. 4 presents the same display area 310 as FIG. 3 with an arbitrary compositing window 400 decomposed into three tiles: tile #1 401, tile #2 402, and tile #3 403. Compositing window 400 consists of a right-facing semicircle centered at coordinate points 400, 300; a left-facing semicircle centered at coordinate points 400, 700; and a pinched center that spans a length equal to 300 pixel lengths. Each of the semicircles has a radius equal to 300 pixel lengths. Tile #3 403 consists of the right half of compositing window 400. Tile #1 401 is a circle centered at coordinate points 400, 300 and with a radius equal to 100 pixel lengths. Tile #2 402 is defined as the left half of compositing window 200 outside of tile #1 401. FIG. 4 serves to demonstrate that the present invention can support compositing windows and tiles with unusual shapes. One skilled in the art will note that the parameters that define compositing window 400 and each of the tiles 401-3 can be expressed in terms of dimensions of one of the pixels. Alternatively, the parameters that define compositing window 400 and each of the tiles 401-3 can more simply be expressed by a reference to index code 00 in tile pattern library 200 of FIG. 2.

Where the compositing window and each of the tiles have polygon shapes, coordinates for the corners can be used as the parameters that define the compositing window and each of the tiles, though one skilled in the art will recognize that there are many other means by which polygon shaped compositing windows and tiles can be characterized. FIG. 5 presents a rectangular compositing window 500 decomposed into four tiles: tile #1 501, tile #2 502, tile #3 503, and tile #4 504. Rectangular compositing windows and tiles are used in conventional approaches to spatial compositing. Likewise, the parameters that define compositing window 500 and each of the tiles 501-4 can be simply expressed by reference to index code 32 in tile pattern library 200 of FIG. 2.

In FIG. 1, at a step 110, the parameters that define the compositing window and each of the tiles are communicated to the compositor. This enables the compositor to create, in its frame buffer, the compositing window and tiles so that memory locations within the frame buffer are predesignated to receive images with dimensions corresponding to those of their affiliated tiles. It is desirable to minimize the amount of data necessary to be communicated to define the compositing window and each of the tiles. This limits the amount of overhead information that must be passed through any communication infrastructure (including but not limited to busses) that interconnects the central processing unit and various peripheral chips that support computer graphics.

FIG. 6 shows the step for minimizing an amount of data needed to convey the parameters that define the compositing window and each of the tiles by referencing an index code for the chosen tile pattern. In FIG. 6, at a step 602, an index code that identifies the chosen tile pattern is obtained from the tile pattern library. The index code minimizes the amount of data needed to convey the parameters that define the compositing window and each of the tiles.

In FIG. 1, after obtaining the index code that defines the compositing window and each of the tiles at step 110, communications to the compositor can occur through a variety of means recognizable to one skilled in the art. To facilitate the use of high performance digital displays while still supporting legacy analog technology, the Digital Visual Interface (DVI) standard has been developed to establish a protocol for communications between central processing units and peripheral graphics chips. Therefore, in a preferred embodiment, the communications medium uses the DVI standard. Within the DVI standard, communications of the index code can be realized via a Transitional Minimized Differential Signal (TMDS) data link or an Inter Integrated Circuit (I$^2$C) bus. The present invention can support communications through a system using either of these channels. Frames of digital video images are typically transmitted via a TMDS data link. In one embodiment, the index code can be embedded within a transmitted frame of digital video images. In this case, the index code data is stored in the frame buffer in an area outside of the display area. FIG. 7 presents the same rectangular compositing window 500 as FIG. 5 with the index code 701 included in the frame buffer 300 outside of the display area 310.

Finally, in FIG. 1, at a step 112, each of the tiles is assigned to a corresponding digital video display unit. At a step 114, each of the tiles receives an image output from its corresponding assigned digital video display unit, thereby spatially compositing digital video images with a tile pattern library.

One skilled in the art will recognize that the above described method substantially reduces the amount of data needed to convey the parameters that define the compositing window and each of the tiles. This can be demonstrated in reference to the example of the rectangular compositing window with the four rectangular tiles. In such an arrangement, coordinate values for each of the corners can be communicated to define the compositing window and each of the four tiles. This would amount to twenty sets of coordinates. The present invention reduces this amount of data to a single index code. Furthermore, because the coordinates are transmitted as binary numbers, the data compression realized by this method has a larger absolute effect than appears in an example in which the numbers are expressed in decimal format. For instance, in the example above, the range of pixel coordinates extends from zero to one thousand. In decimal format, these coordinate values require four digits to be expressed; in binary format, ten bits are required to communicate each coordinate value. With twenty sets of coordinates and two coordinate values per set, 400 bits are necessary to communicate the parameters. By contrast, in a tile pattern library with 256 tile patterns, each tile pattern can be represented by an index code eight bits in length. Thus, in this example, the reduction in data is fifty-fold. Where spatial compositing involves large numbers of tiles or where compositors are combined in cascading stages such that the output of one or more compositors is an input for another compositor, one skilled in the art will recognize that the compression of data is even more substantial.

The steps described above with respect to FIGS. 1 and 6 can be implemented in software, hardware, firmware, or a combination thereof.

FIG. 8 shows a system for spatially compositing digital video images with a tile pattern library. In FIG. 8, tile compositing controller 800 includes a counter 801 to count digital video display units, 802 and 803, whose image outputs will be spatially composited by a compositor 804. One skilled in the art will recognize that additional digital video display units can be included in the system. Tile pattern chooser 805 chooses a tile pattern from tile pattern library 200. The amount of tiles in the chosen tile pattern equals the number of digital video display units counted by the counter 801. The chosen tile pattern is sent to a compositing window creator 806. Compositing window creator 806 creates a compositing window to reside within a display area of the compositor 804. The compositing window created by the compositing window creator 806 has a shape that matches the shape of the periphery of the chosen tile pattern. The compositing window created by the compositing window creator 806 is formed by pixels within the display area. Decomposer 807 decomposes the compositing window into a number of tiles where the number is equal to the amount of tiles in the chosen tile pattern. The shape and position of each of the tiles matches the shape and position of a corresponding tile in the chosen tile pattern. Each of the tiles is formed by pixels within the display area.

In a preferred embodiment, tile compositing controller 800 includes a communications medium 808 to communicate, to the compositor 804, the parameters that define the compositing window and each of the tiles. FIGS. 9A and 9B show alternative embodiments of the communications medium 808. In FIGS. 9A and 9B, index code obtainer 910 obtains, from the tile pattern library 200, the index code 999 for the chosen tile pattern. After identifying the index code 999, communications to the compositor can occur through a variety of means recognizable to one skilled in the art. To facilitate the use of high performance digital displays while still supporting legacy analog technology, the Digital Visual Interface (DVI) standard has been developed to establish a protocol for communications between central processing units and peripheral graphics chips. Therefore, in a preferred embodiment, the communications medium uses the DVI 920 standard. Within the DVI standard, communications of compositing window and tile parameters can be realized via a Transitional Minimized Differential Signal (TMDS) data link or an Inter Integrated Circuit (I²C) bus. The present invention can support communications through a system using either of these channels. FIG. 9A shows an embodiment using TMDS data link 921 while FIG. 9B shows an alternative embodiment using an Inter Integrated Circuit bus 923. Frames of digital video images are typically transmitted via a TMDS data link. In one embodiment, parameters can be embedded within a transmitted frame of digital video images. In this case, the parameter data is stored in the frame buffer in an area outside of the display area. FIG. 9A provides the option of communicating within a digital video frame 922.

Returning to FIG. 8, tile assigner 809 assigns each of the tiles to a corresponding digital video display unit. Finally, image transmitter 810 transmits, to each of the tiles within the display area of the compositor 804, an image output of the corresponding digital video display unit, thereby spatially compositing digital video images with a tile pattern library.

Environment of the Invention

FIG. 10 is a block diagram of an example computer system that can support an embodiment of the present invention. The environment is a computer system 1000 that includes one or more processors, such as a central processing unit (CPU) 1004. The CPU 1004 is connected to a communications bus 1006. Various software embodiments are described in terms of this example computer system. After reading this description, it will be apparent to a person skilled in the relevant art how to implement the invention using other computer systems and/or computer architectures.

Computer system 1000 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc., which is read by and written to by removable storage drive 1014. As will be appreciated, the removable storage unit 1018 includes a computer usable storage medium having stored therein computer software and/or data.

The computer system 1000 also includes conventional hardware such as a display 1030, a keyboard 1032, and a pointing device 1034. A digitizer 1036 and a camera 1038 can be used for capturing images to process according to the present invention. Alternatively, images can be retrieved from any of the above-mentioned memory units, or via a communications interface 1024.

In alternative embodiments, secondary memory 1010 may include other similar means for allowing computer programs or other instructions to be loaded into computer system 1000. Such means can include, for example, a removable storage unit 1022 and an interface 1020. Examples can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

The communications interface 1024 allows software and data to be transferred between computer system 1000 and external devices via communications path 1026. Examples of communications interface 1024 can include a modem, a network interface (such as an Ethernet card), a communications port (e.g., RS-232), etc. Software and data transferred via communications interface 1024 are in the form of signals which can be electronic, electromagnetic, optical or other signals capable of being received by communications interface 1024 via communications path 1026. Note that communications interface 1024 provides a means by which computer system 1000 can interface to a network such as the Internet.

The present invention is described in terms of this example environment. Description in these terms is provided for convenience only. It is not intended that the invention be limited to application in this example environment. In fact, after reading the complete description, it will become apparent to a person skilled in the relevant art how to implement the invention in alternative environments.

Software and Hardware Embodiments

The present invention is preferably implemented using software running (that is, executing) in an environment similar to that described above with respect to FIG. 10.

Computer programs (also called computer control logic) are stored in main memory and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. Alternatively, the computer program product may be downloaded to computer system 1000 over communications path 1026. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

In other embodiments, the invention is implemented in software, hardware, firmware, or any combination thereof.

CONCLUSION

While an embodiment of the present invention has been described above, it should be understood that it has been presented by way of example only, and not limitation. It will be understood by those skilled in the art that various changes in form and detail may be made therein without departing from the spirit and scope of the invention as defined in the appended claims. Thus, the breadth and scope of the present invention should not be limited by the above-described exemplary embodiment, but should be defined only in accordance with the following claims and their equivalents.

What is claimed is:

1. A method for spatially compositing digital video images with a tile pattern library, comprising the steps of:
   (b) choosing a tile pattern from the tile pattern library;
   (c) creating, for a single frame, a compositing window within a display area of a compositor, wherein a first shape of said created compositing window matches a second shape of a periphery of said chosen tile pattern and wherein said created compositing window is formed by pixels within the display area;
   (d) decomposing said created compositing window into a first number of contiguous tiles, wherein the first number of contiguous tiles equals a second number of contiguous tiles in said chosen tile pattern, wherein a third shape and a first position of each of the first number of contiguous tiles matches a fourth shape and a second position of a corresponding tile in said chosen tile pattern, wherein at least one of the third shape and the first position of a first tile of the first number of contiguous tiles is different from at least one of the third shape and the first position of a second tile of the first number of contiguous tiles, wherein at least one of an angle formed along a boundary between said first tile and said second tile is other than perpendicular and a portion of said boundary is a nonlinear curve, and wherein each of the first number of contiguous tiles is formed by the pixels within the display area;
   (e) assigning each tile of the first number of contiguous tiles to a corresponding digital video display unit; and
   (f) receiving, at each tile of the first number of contiguous tiles, an image output of said assigned corresponding digital video display unit, thereby spatially compositing the digital video images with the tile pattern library.

2. The method of claim 1, further comprising beforehand the step of:
   (a) counting the digital video display units from which the image outputs will be spatially composited by the compositor such that said counted digital video display units determine a maximum for second number of contiguous tiles in said chosen tile pattern.

3. The method of claim 2, wherein steps (a) to (f) are performed for each frame in a dynamic sequence of frames of the digital video images.

4. The method of claim 1, wherein parameters that define each of the first number of contiguous tiles are variable.

5. The method of claim 4, wherein an area of each of the first number of contiguous tiles is a function of a complexity of the image output of said assigned corresponding digital video display unit.

6. The method of claim 5, wherein said chosen tile pattern takes into account the complexity of the image output of each of said counted digital video display units.

7. The method of claim 5, wherein the function is an inverse function.

8. The method of claim 2, wherein steps (a) to (f) are performed by a tile compositing controller.

9. The method of claim 1, further comprising after step (d), the step of communicating, to the compositor, first parameters that define the compositing window and second parameters that define each of the first number of contiguous tiles.

10. The method of claim 9, wherein said communicating step occurs within a frame of the digital video images.

11. The method of claim 9, wherein said communicating step occurs through a first channel separate from a second channel used to communicate the frame of the digital video images.

12. The method of claim 9, wherein said communicating step minimizes an amount of data needed to convey the first parameters that define the compositing window and the second parameters that define each of the first number of contiguous tiles.

13. The method of claim 12, wherein said communicating step comprises obtaining, from the tile pattern library, an index code that identifies said chosen tile pattern, wherein the index code minimizes the amount of the data needed to convey the first parameters that define the compositing window and the second parameters that define each of the first number of contiguous tiles.

14. A system for spatially compositing digital video images with a tile pattern library, comprising:
   (a) a tile pattern chooser to choose a tile pattern from the tile pattern library;
   (b) a compositing window creator to create, for a single frame, a compositing window to reside within a display area of the compositor, wherein a first shape of the compositing window created by said compositing window creator matches a second shape of a periphery of the tile pattern chosen by said tile pattern chooser and wherein the compositing window created by said compositing window creator is formed by pixels within the display area;
   (c) a decomposer to decompose the compositing window created by said compositing window creator into a first number of contiguous tiles, wherein the first number of contiguous tiles equals a second number of contiguous tiles in the tile pattern chosen by said tile chooser, wherein a third shape and a first position of each of the first number of contiguous tiles matches a fourth shape and a second position of a corresponding tile in said chosen tile pattern, wherein at least one of the third shape and the first position of a first tile of the first number of contiguous tiles is different from at least one of the third shape and the first position of a second tile of the first number of contiguous tiles, wherein at least one of an angle formed along a boundary between said first tile and said second tile is other than perpendicular and a portion of said boundary is a nonlinear curve, and wherein each of the first number of contiguous tiles is formed by the pixels within the display area;

(d) a tile assigner to assign each tile of the first number of contiguous tiles to a corresponding digital video display unit; and (e) an image transmitter to transmit, to each tile of the first number of contiguous tiles within the display area of the compositor, an image output of the corresponding digital video display unit assigned by said tile assigner, thereby spatially compositing the digital video images with the tile pattern library.

15. The system of claim 14, further comprising a counter to count digital video display units from which the image outputs will be spatially composited by the compositor such that the digital video display units counted by said counter determine a maximum for the second number of contiguous tiles in the tile pattern chosen by said tile pattern chooser.

16. The system of claim 14, further comprising a tile compositing controller.

17. The system of claim 14, further comprising a communications medium to communicate, to the compositor, first parameters that define the compositing window and second parameters that define each of the first number of contiguous tiles.

18. The system of claim 17, wherein said communications medium meets Digital Visual Interface specifications.

19. The system of claim 17, wherein said communications medium is a Transitional Minimized Differential Signal data link.

20. The system of claim 17, wherein said communications medium is within a frame of the digital video images.

21. The system of claim 17, wherein said communications medium is an Inter Integrated Circuit bus.

22. The system of claim 17, wherein said communications medium is configured to minimize an amount of data needed to convey the first parameters that define the compositing window and the second parameters that define each of the first number of contiguous tiles.

23. The system of claim 22, wherein said communications medium comprises an index code obtainer to obtain, from the tile pattern library, an index code that identifies the tile pattern chosen by said tile pattern chooser, wherein the index code minimizes the amount of the data needed to convey the first parameters that define the compositing window and the second parameters that define each of the first number of contiguous tiles.

* * * * *